United States Patent [19]
Sieurin

[11] 3,823,812
[45] July 16, 1974

[54] MATERIAL HANDLING APPARATUS
[75] Inventor: Donald Sieurin, Northboro, Mass.
[73] Assignee: Morgan Construction Company, Worcester, Mass.
[22] Filed: Oct. 18, 1972
[21] Appl. No.: 300,733

[52] U.S. Cl............ 198/31 AB, 198/20 R, 198/218, 214/1 P, 214/1 BB
[51] Int. Cl............................................. B65g 47/26
[58] Field of Search........ 198/20 R, 107, 219, 31 R, 198/31 AB, 35, 107, 219, 218; 214/1 P, 1 BB

[56] References Cited
UNITED STATES PATENTS
2,364,386   12/1944   Peterson........................... 198/20 X OTHER PUBLICATIONS
SN 368,952, A.P.C. publication of Cramer.

Primary Examiner—Richard A. Schacher
Assistant Examiner—Joseph E. Valenza
Attorney, Agent, or Firm—Chittick, Thompson & Pfund

[57] ABSTRACT

An apparatus for handling elongated elements, for example bar products being delivered laterally from the delivery side of a cooling bed in a rolling mill. The apparatus includes a longitudinally extending assembly device for receiving and temporarily accumulating the elements at a first location. At least two longitudinally extending element conveyors are positioned at other locations spaced laterally from and parallel to the assembly device. A transfer mechanism is employed to carry groups of elements laterally from the assembly device onto one or the other of the conveyors.

16 Claims, 7 Drawing Figures

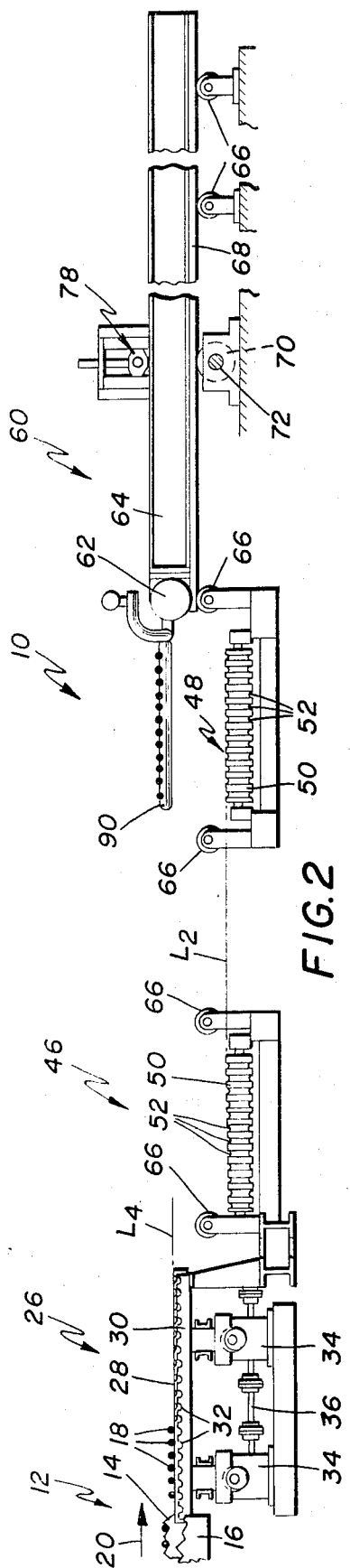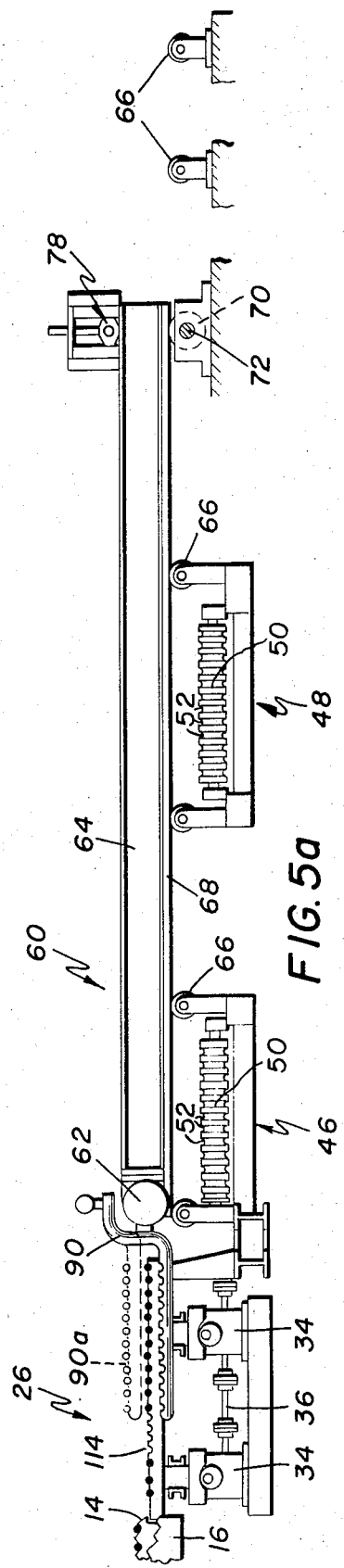

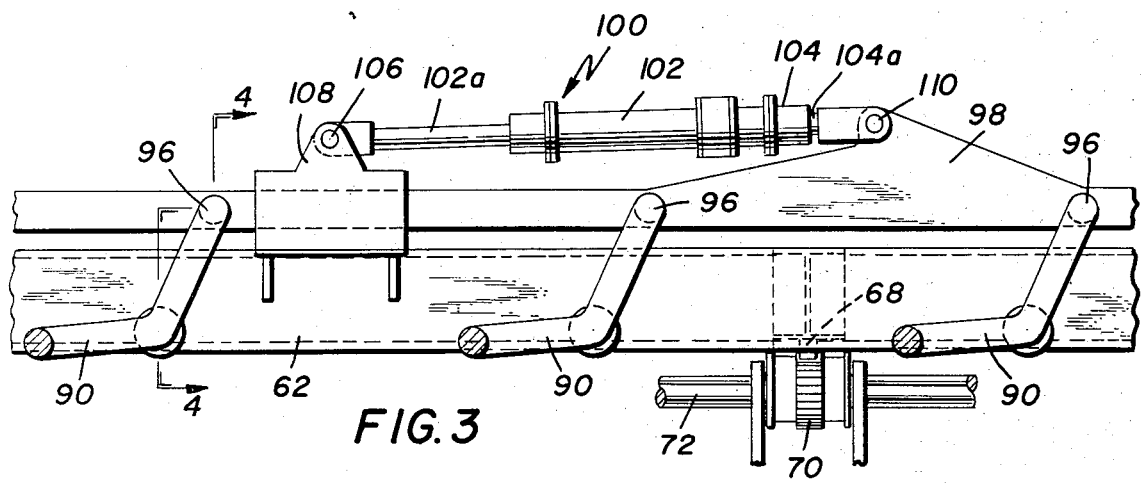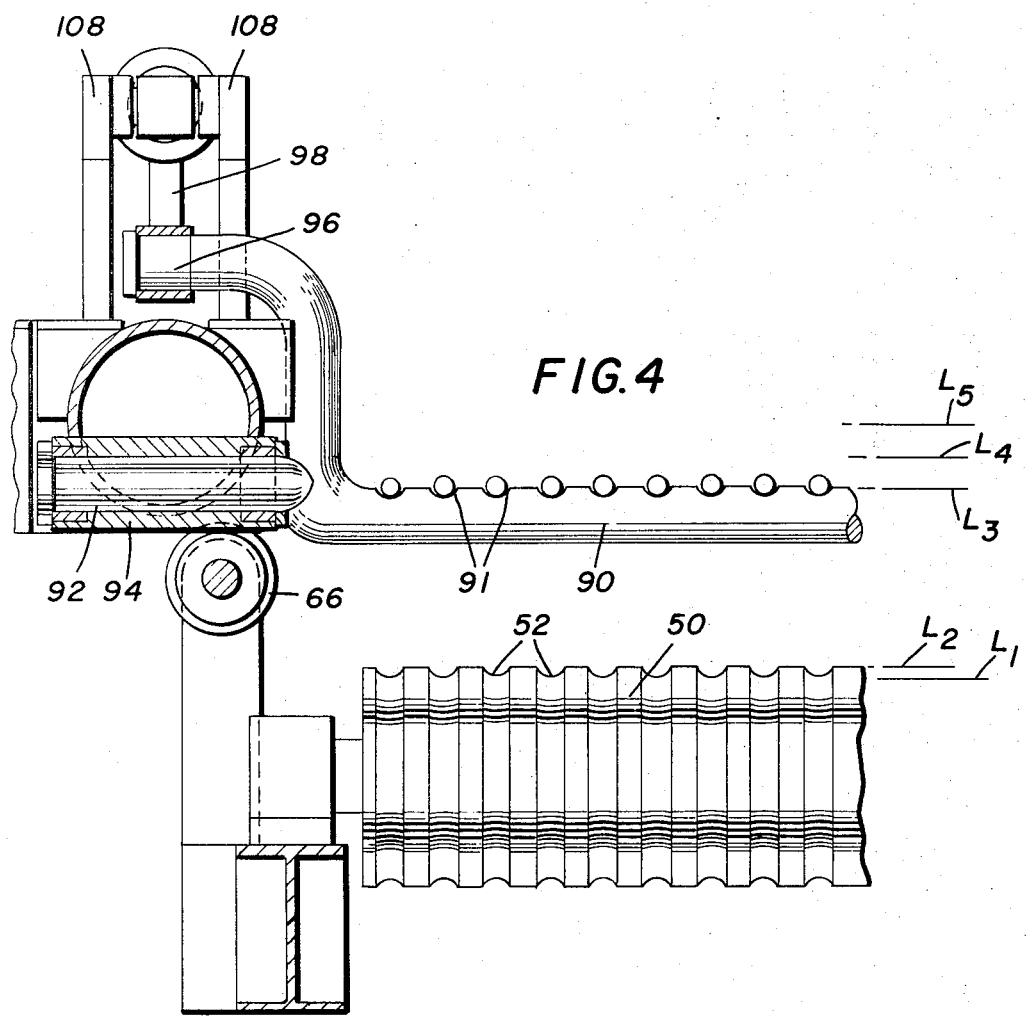

3,823,812

MATERIAL HANDLING APPARATUS

DESCRIPTION OF THE INVENTION

This invention relates generally to the art of material handling, and is concerned in particular with a novel and improved apparatus for handling elongated elements such as for example bars and other like products being delivered laterally from a cooling bed in a rolling mill.

In conventional bar mill installations, the successively rolled bars are normally directed axially from the mill to the center of a double-sided carryover cooling bed, at which point the bars are alternately switched laterally to opposite sides of the bed. Thereafter, the bars are cooled while being progressively shifted laterally in opposite directions towards the delivery sides of the bed. Roller tables are positioned at the delivery sides of the bed to receive the cooled bars and to axially convey them to shears which operate to subdivide the bars into customer lengths for subsequent packaging and shipment. Although the arrangement of a double-sided cooling bed, with each side having its own run-off table and shears, is capable of handling the full production rate of the mill, it will be appreciated that the necessity of alternately switching and thereafter shifting successive bars in opposite directions creates material flow problems, particularly where different heats are being rolled in the mill. To avoid such problems, it is considered preferable to employ a single-sided cooling bed, but to date this has not been practical with modern high speed mills because the single run-off table and shear arrangement normally associated with a single-sided bed cannot operate rapidly enough to handle the full capacity of the mill.

The present invention is directed to a solution of this and similar problems, and has as its general objective the provision of a novel and improved material handling apparatus for laterally receiving elongated elements at one location and for laterally transferring the said elements alternately onto one of several conveying means located at other laterally spaced locations.

A more specific object of the present invention is to provide, in a bar mill, an apparatus for laterally receiving bars from the delivery side of a cooling bed, and for thereafter laterally transferring groups of the bars alternatively to one of several laterally adjacent independently operable run-off tables, each of which has its own shear arrangement associated therewith. To this end, the present invention contemplates the use of a longitudinally extending assembly means for receiving and temporarily accumulating bars being shifted laterally from the delivery side of the cooling bed. At least two independently operable run-off tables are located laterally of and in parallel relationship with the assembly means. Each run-off table feeds a separate shear arrangement for subdividing bars into customer lengths. The shear arrangements, which may be of any conventional design, are not considered as part of the present invention and thus will not be described in any further detail.

A laterally movable transfer means is employed to carry groups of the bars from the assembly means to one or the other of the run-off tables. With this arrangement, successive bars can be received by a cooling bed and thereafter shifted laterally in one direction towards one delivery side. Upon arrival at the delivery side, the bars will be temporarily accumulated by the assembly means, from which point they will be carried laterally in groups by the transfer means to one of several run-off tables. Thus, one group of bars can be processed on one run-off table, while another group of bars is being carried to another run-off table, and still another group of bars is in the process of accumulating in the receiving means. The increased capacity provided by this arrangement is far in excess of that normally provided by conventional equipment, and more than adequate to take care of the increased delivery rates of cooling beds in modern bar mill installations.

Another object of the present invention is to provide means for maintaining a predetermined lateral spacing between the bars while they are accumulating in the assembly means and thereafter while they are being transferred laterally to one or the other of several laterally arranged run-off tables. A further object of the present invention is to provide a material handling apparatus of the type referred to above which is rugged in construction, economical to manufacture and simple to maintain and repair.

These and other objects and advantages of the present invention will become more apparent as the description proceeds with the aid of the accompanying drawings wherein:

FIG. 2 is a sectional view taken along line 2—2 of FIG. 1;

FIG. 3 is a sectional view on an enlarged scale taken along line 3—3 of FIG. 1;

FIG. 4 is a sectional view taken along line 4—4 of FIG. 3, but with the lifting members shown pivoted to their intermediate positions; and, FIGS. 5A to 5C are schematic illustrations depicting various steps in the operational sequence of the apparatus.

Figure 1:
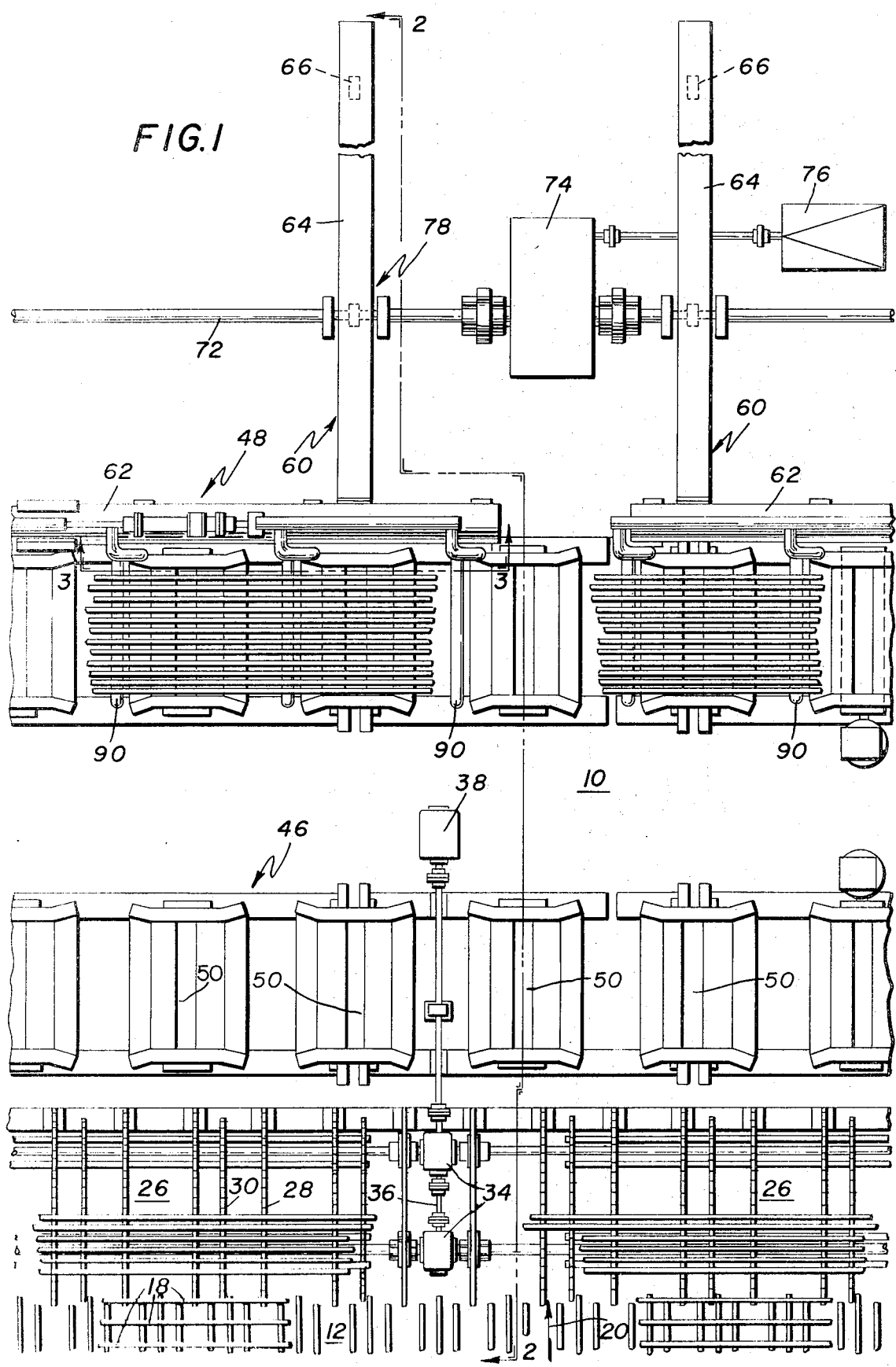
FIG. 1 is a partial plan view of a material handling apparatus embodying the concepts of the present invention.

Referring now to the drawings wherein like numbers designate like parts throughout the several views, and with initial reference to FIGS. 1 and 2, there is generally indicated at 10 an apparatus embodying the concepts of the present invention. The apparatus is positioned adjacent to the delivery side of a cooling bed 12 in a bar mill. The cooling bed is of the conventional single-sided carryover design with laterally extending stationary notched racks 14 having interspersed therebetween movable notched carryover racks 16. The movable racks are manipulated in a known manner to laterally transfer hot rolled bar products, for example the round bars indicated typically at 18, along the stationary notched racks 14 in a direction indicated diagrammatically in FIG. 1 by the arrow 20.

As herein illustrated, the apparatus includes an assembly means generally indicated at 26 for laterally receiving and accumulating the bars 18 being shifted laterally off of the delivery end of the cooling bed 12. The assembly means 26 includes a stationary rack having a plurality of horizontally extending support members 28, and a movable rack having a plurality of carryover members 30 interspersed between the fixed support members 28. The upper bar engaging surfaces of the members 28 and 30 are preferably notched as at 32 to thereby maintain a lateral spacing between the products being handled. This lateral spacing preferably corresponds to the lateral spacing between the notches of the shear knives to be employed at a remote location where subdividing the bars into customer lengths. The carryover members 30 are movable in a generally elliptical path by means of eccentric drives contained within the housings 34. The housings are interconnected by an intermediate shaft assembly 36 and are driven by a common drive motor 38.

Each time a bar 18 is shifted laterally from the cooling bed 12 to the assembly means 26, the carryover members are moved through one complete cycle to shift the bar laterally to the next notch 32 on the fixed support members 28. After a predetermined number of bars, say for example a dozen, have been thus accumulated in laterally spaced relationship, the carryover members 30 are cycled two or three times to provide a spacing between each group of twelve bars.

It will be understood that the assembly means 26 extends longitudinally along the delivery side of the cooling bed 12. The apparatus further includes at least two run-off tables generally indicated at 46 and 48. The run-off tables also extend longitudinally and in laterally spaced parallel relationship with each other and with the assembly means 26. Each runoff table has spaced along the length thereof a plurality of transversely extending driven table rollers 50. The table rollers are also preferably grooved as at 52 with the spacing between the grooves 52 being the same as the spacing between the notches 32 on the fixed support members 28 and the carryover members 30 of the assembly means 26. The run-off tables 46 and 48 are each independently operable to axially advance bars deposited thereon. Although not shown in the drawings, it will be understood that each run-off table feeds a shear arrangement which is operable to subdivide a plurality of bars or other like elongated elements into shorter customer lengths which can then be packaged for shipment.

As is best shown in FIG. 2, the table rollers 50 of the run-off tables 46 and 48 are at a common level indicated diagrammatically at $L_2$ which is beneath the level $L_4$ of the fixed support members 28 of the assembly means 26. The apparatus further includes a transfer assembly generally indicated at 60 for removing groups of bars 18 from the assembly means 26 and for laterally transferring the bars to either of the run-off tables 46 and 48. The transfer assembly includes a carrier which is made up of a longitudinally extending tubular frame member 62 to which is attached a plurality of laterally extending spaced frame members 64. The frame members 62 and 64 provide a rigid assembly. The frame members 64 are supported on rollers 66 for movement over the run-off tables 46 and 48 in opposite directions transverse to the lengths thereof. The frame members 64 are further provided along the lengths thereof with gear racks 68 which cooperate in meshed relationship with drive pinions 70. The drive pinions are in turn interconnected by shafts 72 and are driven by a common drive means which includes a gear reducer 74 and a motor 76. Hold-down mechanisms 78 rotatably engage the upper surfaces of the frame members 64 to exert a downward force thereon which insures that the drive pinions 70 remain in meshed engagement with the gear racks 68.

It will be understood from the foregoing that as viewed in FIG. 2, rotation of the drive pinions 70 in a clockwise direction will cause the transfer assembly 60 to move laterally away from the assembly means 26, and that opposite rotation of the drive pinions 70 in a counterclockwise direction will cause the transfer assembly 60 to move laterally towards the assembly means.

With additional reference to FIGS. 3 and 4, it will be seen that the transfer assembly 60 further includes a plurality of element engaging or lifting members 90. The lifting members are pivotally mounted on the tubular frame member 62 by means of short shaft-like extensions 92 which are rotatably received in sleeve bearings 94. The upper ends of the lifting members 90 are pivotally connected as at 96 to a common cross bar 98. An operating means generally indicated at 100 is employed to move the cross bar 98 axially relative to the frame member 62. The operating means is comprised basically of two back-to-back axially aligned piston-cylinder units 102 and 104, with the former having a longer stroke than the latter. The piston rod 102a of cylinder 102 is pivotally attached as at 106 to a bracket 108 which is in turn secured as by welding to the tubular frame member 62. The other end of the operating means 100 which is defined by the piston rod 104a of cylinder 104, is pivotally attached as at 110 to the cross bar 98.

As viewed in FIG. 4, when the piston rods 102a and 104a are fully retracted, the lifting members 90 will be adjusted to the lowermost level $L_1$, which is beneath the level $L_2$ of the table rollers 50 of the run-off tables 46 and 48. Extension of only the piston rod 102a will cause the lifting members to pivot about the axes of their respective shaft-like extensions 92 in a clockwise direction (as viewed in FIG. 3) to an intermediate level $L_3$ which is above the level $L_2$ of the table rollers 50, yet beneath the level $L_4$ of the fixed support members 28 on the assembly means 26. With the piston rod 102a thus extended, further extension of piston rod 104a will elevate the lifting members to the uppermost level $L_5$, which is above the level of the fixed support members 28.

Figure 5B:
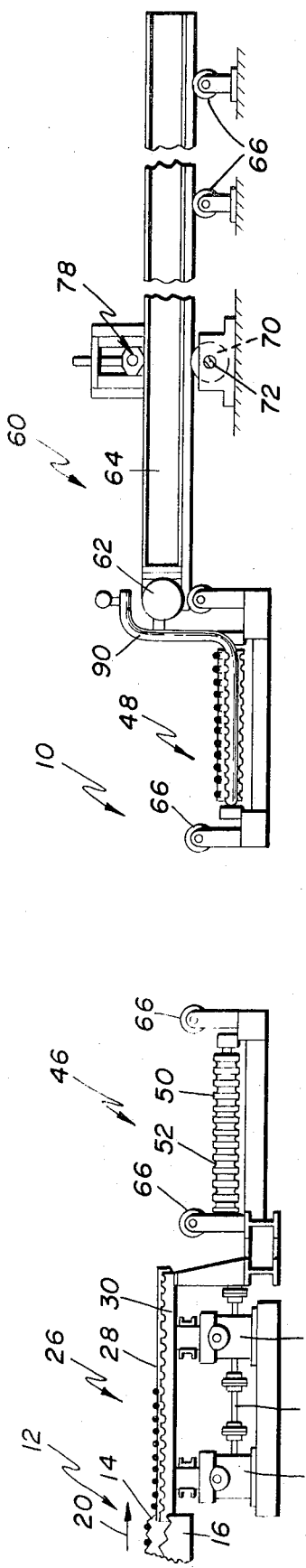
Figure 5C:
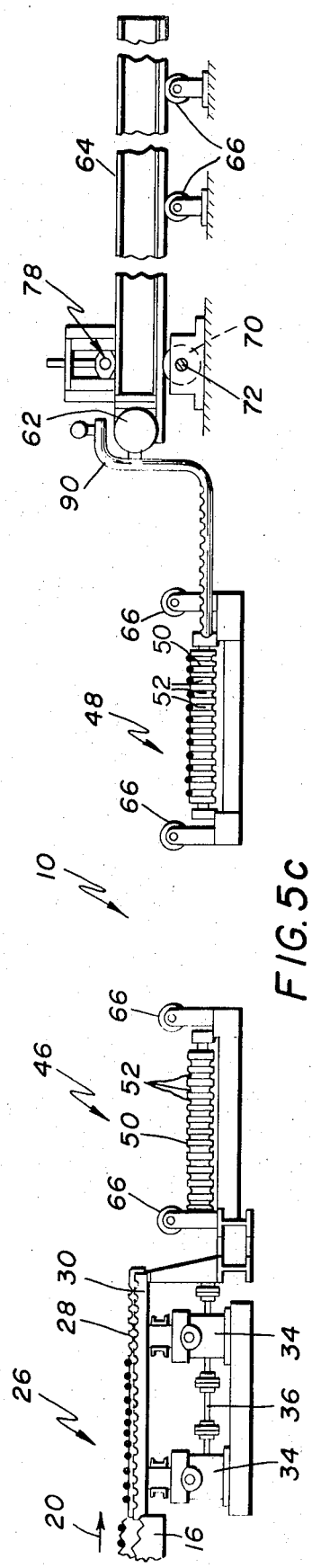

The operation of the apparatus will now be reviewed with additional reference to FIGS. 5A to 5C. At the stage shown in FIG. 5A, a group of a dozen bars 18 has been laterally accumulated on the fixed support members 28 of the assembly means 26. By rapidly cycling the carryover members 30 several times between bar deliveries to the assembly means 26, a space 114 is created between the aforementioned group of bars and the next group which has already begun to accumulate. The drive pinions 70 have been operated in a counterclockwise direction to move the transfer assembly 60 to a position adjacent to the assembly means 26. The piston 102a of the operating means 100 has been extended, thereby pivotally elevating the lifting members 90 to the intermediate level $L_3$, which is slightly below the level $L_4$ of the fixed support members 28.

The next operational stage involves removal of the bars from the assembly means 26. This is accomplished by extending the piston rod 104a to pivotally elevate the lifting members to their uppermost position at level $L_5$ as shown in dotted at 90a in FIG. 5A. This lifts the bars 18 off of the fixed support members 28 and frees them for subsequent lateral movement away from the assembly means 26. At this point, it should be noted that the lifting members 90 are also preferably notched as at 91 to maintain the lateral spacing between the bars 18 which was previously established by the notches 32 on the fixed support members 28. The notches 91 correspond generally in spacing and cross-sectional configuration with the grooves 52 on the table rollers 50.

Once the bars 18 have been lifted off of the assembly means 26, and as is best shown in FIG. 2, the drive pinions 70 are operated to shift the carrier assembly 60 away from the assembly means 26 to a location at which the fully elevated lifting members 90 and the bars 18 supported thereon overlie one of the run-off tables, for example table 48.

Thereafter, as shown in FIG. 5B, both of the piston rods 102a and 104a of operating means 100 are retracted to drop the lifting members between the table rollers 50 to the lowermost level $L_1$, which is beneath the level $L_2$ of the table rollers. This causes the bars 18 to be deposited on the table rollers 50. The grooves 52 on the table rollers 50 maintain the previously established lateral spacing between the bars and the table rollers can then be driven to axially propel the bars to a shear arrangement (not shown) which will operate to subdivide the bars into customer lengths. While bars are being deposited on the run-off table 48, another group of bars is continuing to accumulate on the assembly means 26.

After a group of bars has been deposited on run-off table 48, and as is shown in FIG. 5C the pinions 70 are again actuated to move the carrier assembly 60 laterally to a location at which the lifting members 90 are retracted from beneath the run-off table 48. Thereafter, only the piston 102a of operating means 100 is extended to raise the lifting members 90 to their intermediate level $L_3$. Once this has been accomplished, the drive pinions are again actuated in a counterclockwise direction to return the carrier assembly 60 to the position shown in FIG. 5A. By this time, another group of bars has accumulated on the assembly means 26, and this other group can now be removed from the assembly means and deposited on the run-off table 46, while the bars previously deposited on the run-off table 48 are being subdivided by the shear arrangement associated therewith, and further while another group of bars continues to accumulate on the assembly means.

Having thus described one embodiment of an apparatus constructed in accordance with the present invention, its novel and advantageous features will now be better understood by those skilled in the art. Among such features is the ability of the apparatus to handle the full output of a single-sided cooling bed in a modern high speed mill installation. This is accomplished by employing an assembly means 26 for continuously receiving and temporarily accumulating bars from the delivery side of the cooling bed, and further by employing a transfer assembly 60 to remove bars from the assembly means and to laterally transfer the bars onto one of several run-off tables. The width of the assembly means 26 and the number of run-off tables required will of course depend on variables such as for example the production rate of the mill and the efficiency of other allied equipment, in particular, the shears which subdivide the bars into customer lengths. In any event, however, at any given stage during the operation of the apparatus, one group of bars or other like elongated elements can be processed on one run-off table, while another group is being carried by the transfer assembly to another empty run-off table, and while still another group is in the process of accumulating on the assembly means.

It will also be appreciated that the apparatus is simple in both design and operation. The components can for the most part be fabricated from readily available standard structural shapes, thus reducing the overall cost of an installation. A minimum number of drives is employed, thus further reducing capital expenditures as well as subsequent maintenance problems. Use of the apparatus is not restricted to rolling mill applications. The apparatus may be employed whereever there exists a need for an improved arrangement for handling elongated elements.

In view of the foregoing, it will further be appreciated that certain changes and modifications can be made to the apparatus herein employed for illustrative purposes, without departing from the spirit and scope of the invention. For example, the design of the assembly means may if desired be changed to an intermittently operating chain conveyor system, or to a simple inclined ramp. Likewise the number of run-off tables employed and the design and manner of moving the transfer assembly and/or the lifting members may also be changed. The table rollers on the run-off table may include magnetic means which would preclude the necessity for grooving the table rollers and notching the lifting members and the support members of the assembly means.

It is my intention to cover these and all other changes and modifications of the embodiment herein chosen for purposes of disclosure which do not depart from the spirit and scope of the invention as defined by the claims appended hereto.

I claim:

1. Apparatus for handling elongated elements comprising in combination: longitudinally extending assembly means for laterally receiving and accumulating a plurality of elongated elements; at least two longitudinally extending conveying means spaced laterally from each other and from said assembly means, said conveying means being operable to axially convey elongated elements deposited thereon; support means fixed relative to said assembly means and said conveying means; carrier means mounted on said support means for movement horizontally thereon over said conveying means in opposite directions transverse to said assembly means; and element engaging members mounted on and movable vertically relative to said carrier means for removing elements from said assembly means and for depositing said elements on one or the other of said conveying means.

2. The apparatus as claimed in claim 1 further characterized by a plurality of transversely extending element support members spaced along the length of said assembly means.

3. The apparatus as claimed in claim 2 wherein said element support members are fixed, and wherein movable carryover members are employed to laterally transfer elongated elements along said fixed element support members.

4. The apparatus as claimed in claim 3 wherein said fixed element support members and said carryover members are notched to maintain a predetermined lateral spacing between the elongated elements received by said assembly means.

5. The apparatus as claimed in claim 1 wherein said conveying means each comprise roller tables having a plurality of laterally extending driven table rollers spaced along the lengths thereof.

6. The apparatus as claimed in claim 1 wherein the element engaging surfaces of each of said conveying means are located at a level which is beneath that of the element engaging surfaces of said assembly means.

7. The apparatus as claimed in claim 1 wherein said assembly means and said conveying means are arranged in parallel.

8. In a rolling mill, apparatus for handling bars and the like being delivered laterally from a cooling bed, said apparatus comprising in combination: longitudinally extending assembly means for laterally receiving bars from the cooling bed, said assembly means having transversely extending support members spaced along the length thereof onto which the bars are arranged in parallel lateral alignment, at least two longitudinally extending run-off tables spaced laterally from and parallel to said assembly means, each said run-off tables including a plurality of transversely extending table rollers spaced along the length thereof, support means fixed relative to said assembly means and said run-off tables, and transfer means movable horizontally on said support means over said run-off tables for laterally transferring bars from said assembly means to one or the other of said run-off tables, said transfer means having bar engaging members which are movable vertically between the transversely extending support members of said assembly means when removing bars therefrom, said bar engaging members being movable vertically between the table rollers of said run-off tables when depositing bars thereon.

9. The apparatus as claimed in claim 1 wherein said carrier means is comprised of a first elongated frame member extending in a direction parallel to said assembly means and said conveying means, a plurality of laterally spaced second frame members rigidly attached to and extending laterally from said first frame member, and wherein said support means includes roller means engaging said second frame members in a manner which permits horizontal movement of said carrier means over said conveying means in opposite directions transverse to said conveying means and said assembly means.

10. The apparatus as claimed in claim 9 wherein said drive means is comprised of gear racks on said second frame members, rotatable pinions in engagement with said gear racks, and means for driving said pinions in either a clockwise or counterclockwise direction in order to move said carrier means in opposite directions transverse to said conveying means and said assembly means.

11. The apparatus as claimed in claim 9 wherein said element engaging members are pivotally mounted on said first frame member, and wherein said operating means includes a pair of double-acting piston-cylinder assemblies arranged in an axially aligned relationship.

12. The apparatus as claimed in claim 8 further characterized by the transversely extending support members of said assembly means being arranged at a level which is above the level of said run-off tables, and wherein said transfer means is movable over said run-off tables in opposite directions transverse to the lengths thereof.

13. The apparatus as claimed in claim 12 wherein said transfer means includes a carrier having a first frame member extending in a direction parallel to said assembly means and said run-off tables, a plurality of parallel second frame members attached to said first frame member, said second frame members extending laterally from said first frame member in a direction transverse to said assembly means and said run-off tables, and rotatable drive means cooperating with said second frame members to move said transfer means laterally relative to said assembly means in opposite directions transverse to the lengths of said underlying run-off tables.

14. The apparatus as claimed in claim 13 wherein said bar engaging members are pivotally mounted on said first frame member, and operating means mounted on and cooperating with said first frame member for pivotally adjusting said bar engaging members between a lowermost position which is beneath the level of the table rollers of said run-off tables, an uppermost position which is above the level of the support members of said assembly means, and an intermediate position which is above the level of said table rollers but beneath the level of said support members.

15. The apparatus as claimed in claim 14 wherein said operating means is comprised of an assembly of two axially aligned piston-cylinder units, one end of said assembly being pivotally fixed relative to said first frame member, the other end of said assembly being pivotally attached to an arm member which is in turn pivotally attached to said bar engaging members.

16. The apparatus as claimed in claim 15 wherein the relative lengths of said piston-cylinder units are such that one is larger than the other, and wherein extension of only the longer piston will adjust said bar engaging members to the intermediate position, extension of both the longer and shorter pistons will adjust said bar engaging members to the uppermost position, and retraction of both pistons will adjust said bar engaging members to the lowermost position.

* * * * *